United States Patent

[11] 3,628,940

[72] Inventors Paul R. Geissler
Metuchen;
Ellington M. Magee, Scotch Plains, both of N.J.
[21] Appl. No. 788,401
[22] Filed Jan. 2, 1969
[45] Patented Dec. 21, 1971
[73] Assignee Esso Research and Engineering Company

[54] METHOD FOR PRODUCING NITROPHOSPHATE FERTILIZER
8 Claims, 1 Drawing Fig.
[52] U.S. Cl..................................................... 71/35,
23/66, 71/39, 71/43, 71/50
[51] Int. Cl....................................................... C05b 11/06
[50] Field of Search............................................. 71/35, 39,
43

[56] References Cited
UNITED STATES PATENTS
1,856,187  5/1932  Johnson ....................... 71/39 X
2,673,795  3/1954  Hudson ......................... 71/39
2,899,293  8/1959  Munekata ..................... 71/43
3,382,035  5/1968  Slater............................ 71/39 X
3,433,617  3/1969  Legal et al. ................... 71/34 X

*Primary Examiner*—Samih N. Zaharna
*Assistant Examiner*—Bennett H. Levenson
*Attorneys*—Chasan and Sinnock and James N. Blauvelt ABSTRACT: Process for treating calcium phosphate rock having a low fluorine content, with an amount of nitric acid, sufficient to produce an acidulation effluent comprising water-soluble products. The acidulation effluent is treated with a large excess of an ammonium carbonate material, the amount used being sufficient to produce water-soluble ammonium nitrate and phosphate in solution, and a precipitate of calcium carbonate, the solution from which the precipitate is removed being processed to obtain a nitrophosphate fertilizer.

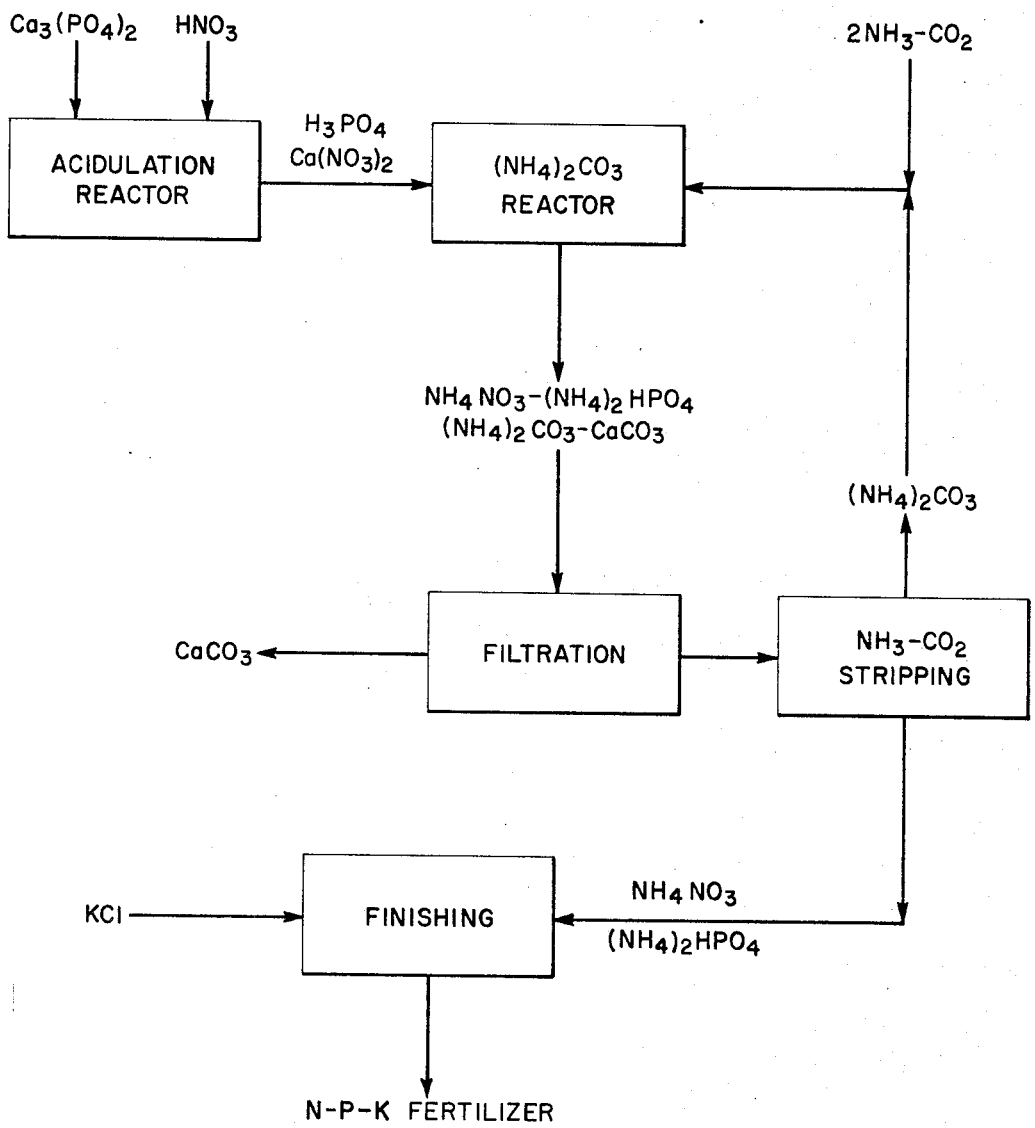

METHOD FOR PRODUCING NITROPHOSPHATE FERTILIZER

PRIOR ART

Previously, in the art, water-soluble phosphorous containing fertilizers have been produced by acidulation of a phosphorous source by sulfuric acid. The acidulation results in the formation of phosphoric acid which can then be formulated into various $N/P_2O_5$ grades by reaction with ammonia. However, the value of this practice is greatly dependent on the availability of a economic source of sulfur. An alternative to the use of sulfuric acid involved preparation of phosphoric acid with an electric furnace; however, this approach has proved to be too expensive for the production of fertilizer materials.

Beginning in the early thirties, a new series of phosphate processes, commonly referred as "nitrophosphate" or "nitric phosphate" processes were developed. Nitric phosphate processes are those in which at least part of the available $P_2O_5$ in the final product has been extracted from phosphate rock with nitric acid. The production of fertilizers by the acidulation of phosphate rock by nitric acid has the advantage of yielding a material containing both nitrogen and phosphorous, while at the same time avoiding the use of sulfuric acid.

The products resulting from the nitric acid acidulation of phosphate rock, also known as the acidulation efficient, will vary depending on the amount of nitric acid used and the reaction can proceed according to any of the following simplified equations:

1. $Ca_3(PO_4)_2 + 6HNO_3 \rightarrow 2H_3PO4 + 3Ca(NO_3)_2$
2. $Ca_3(PO_4)_2 + 4HNO_3 \rightarrow Ca(HPO_4)_2 + 2Ca(NO_3)_2$
3. $Ca_3(PO_4)_2 + 2HNO_3 \rightarrow 2CaHPO_4 + Ca(NO_3)_2$ As can be seen, all of the above reactions result in the formation of calcium nitrate. Because of the hygroscopic nature of calcium nitrate, the end products of the above reaction cannot be directly used for fertilizer purposes. Further processing, involving either removal of the calcium nitrate product or its conversion to less hygroscopic materials, is usually undertaken to overcome this limitation.

In order to remove calcium nitrate byproduct, the prior art has resorted to solvent extraction with suitable solvents, such as alcohols, ketones, tertiary amines, etc., but said extraction processes have been largely unsatisfactory because of solvent losses that have resulted. Alternatively, calcium nitrate removal has been sought by freezing methods, but these methods, although presently in commercial use, are not wholly satisfactory, owing to the great cost involved in the use of expensive refrigeration equipment necessary to obtain the low temperatures required.

As an alternative to removal of calcium nitrate, chemical conversion to less hygroscopic compounds has frequently been undertaken. The most common conversion methods used in the prior art involve reaction of the acidulation effluent with ammonium sulfate and subsequent ammoniation, or ammoniation and subsequent carbonation of the acidulation effluent.

In those processes utilizing ammonium sulfate, commonly referred to as "sulfate recycle" processes, the acidulation effluent is reacted with a solution of ammonium sulfate resulting in the formation of ammonium nitrate and insoluble calcium sulfate. The calcium sulfate is filtered from the solution. The solution, containing ammonium nitrate and phosphoric acid is then ammoniated to produce a soluble nitrophosphate fertilizer. The precipitated calcium sulfate is reconverted to ammonium sulfate by ammoniation-carbonation and then recycled.

In those processes utilizing ammoniation and subsequent carbonation, the acidulation effluent is ammoniated and then carbonated stagewise to convert the calcium nitrate to dicalcium phosphate and calcium carbonate. Although the resulting products are citrate soluble, almost none of the $P_2O_5$ in the fertilizer product is water soluble. Additionally, unless special precautions are taken, reversion to the citrate insoluble, water insoluble tricalcium phosphate may occur during ammoniation.

A variety of commercial processes have been developed in the United States and abroad for the large scale manufacture of complex nitrophosphate fertilizers based on the nitric acid acidulation of phosphate rock. However, all of the prior art processes have handled phosphoric acid neutralization and calcium nitrate conversion as separate stages in the process, and the resultant products will vary depending upon the order of the above-mentioned stages.

Thus, in processes utilizing the above-mentioned equation 3, a neutralization step is unnecessary since the phosphatic component of the acidulation reaction is present in the form of dicalcium phosphate. However, dicalcium phosphate is water insoluble and therefore, the resultant nitrophosphate fertilizer has a phosphatic component which is not water soluble.

In those processes utilizing above-mentioned equation 2 in the nitric acid acidulation step, both neutralization and calcium nitrate conversion are necessary. Again, the phosphatic component of the final fertilizer product is water insoluble. Additionally, the prior art methods have handled the neutralization and calcium nitrate conversion as separate stages.

In those processes wherein the quantity of $HNO_3$ is sufficient to convert all of the Ca in the phosphate rock to $Ca(NO_3)_2$ and $H_3PO_4$, the reaction according to equation 1 has been utilized, and the product will vary depending on the order of the neutralization and calcium nitrate conversion steps. Thus, where ammoniation is initially practiced, the following reaction occurs:

5. $2H_3PO_4 + 3Ca(NO_3)_2 + 4NH_3 \rightarrow 2CaHPO_4 + Ca(NO_3)_2$ $14NH_4NO_3$ It can readily be seen that the final fertilizer product will contain a water insoluble phosphatic component and that the additional calcium nitrate conversion step is necessary since ammoniation, according to this reaction, cannot convert all of the calcium nitrate present.

In order to avoid the problem of water insolubility of the phosphatic component of the final product, processes such as the aforementioned "sulfate recycle" process have been developed wherein the initial step is calcium nitrate conversion. These processes proceed according to the following equation:

$2H_3PO_4 + 3Ca(NO_3)_2 + 3(NH_4)_2SO_4 \rightarrow 2H_3PO_4 + 3CaSO_4 + 6NH_4NO_3$ Thus, the final product has a completely water soluble phosphatic component, however, it is still necessary to ammoniate the reaction mixture in order to neutralize the phosphoric acid. These processes, although they minimize the use of sulfur as a raw material, still are dependent on a source of sulfur or gypsum to make up for process losses.

The well known PEC (Potasse-et-Engrais Chemique, referred to in "Fertilizer Nitrogen" by Vincent Sauchelli, A.C.S. Monograph Series 161, page 202, Rheinhold Publishing Company, 1964) process utilizes carbon dioxide, introduced concurrently with ammonia, to effect calcium nitrate conversion. However, the carbonation is preceded by ammoniation and the process proceeds according to the following simplified equations:

6. $2H_3PO_4 + 3Ca(NO_3)_2 + 4NH_3 \rightarrow 2CaHPO_4 + Ca(NO_3)_2 + 6NH_4NO_3$ 7. $2CaHPO_4 + Ca(NO_3)_2 + 4NH_4NO_3 2NH_3 + H_2O + CO_2 \rightarrow 2CaHPO_4 + CaCO_3 + 6NH_4NO_3$ and results in a fertilizer product having a water insoluble phosphatic content.

In regard to the PEC type ammoniation-carbonation processes, it has not been thought feasible to combine the two separate reaction stages since carbonic gas cannot be fixed in a mass in a durable or permanent way unless the pH of the mass is at least 7, and it is well known that ammonium carbonate is easily decomposed in an acid environment. Thus, the simultaneous addition of ammonia and carbon dioxide in amounts so as to form ammonium carbonate, ammonium bicarbonate or mixtures thereof, or the addition of ammonium carbonate or ammonium bicarbonate, results in a loss of carbon dioxide, and ammoniation of the phosphoric acid calcium nitrate mixtures leads to the formation of dicalcium phosphate. Only when neutralization nears completion does the carbonation process take effect. Indeed, the same difficulty arose in the early stages of the development of the present invention. However, it has been discovered that neutralization and conversion of the nitric acid acidulation effluent comprising mainly phosphoric acid and calcium nitrate, which results in the production of water soluble ammonium phosphate rather than the water insoluble dicalcium phosphate of the PEC Process, can be effected if the acidulation effluent is reacted with a large excess of ammonium carbonate or ammonium bicarbonate. Thus, the present invention, while neutralizing and converting in a single step, also results in a nitrophosphate fertilizer product having a water soluble phosphate content.

FIELD OF THE INVENTION

This invention relates to a process for the production of nitrophosphate fertilizers. More particularly, this invention relates to a nonsulfur utilizing continuous process for the production of water soluble nitrophosphate fertilizers in a wide variety of grades, i.e., those having a broad spectrum of $N/P_2O_5$ ratios ranging from about 1 to 4.0.

SUMMARY OF THE INVENTION

In accordance with the present invention, there is now provided a nitrophosphate fertilizer process which, while based upon the concept of conventional nitric acid acidulation of a suitable phosphorous source, such as phosphate rock, does not suffer from the previous disadvantages of prior art processes discussed above, i.e., dependence on sulfur and/or the presence of water insoluble phosphatic components in the fertilizer composition produced. Briefly, the present process of nitrophosphate production embodies the use of low cost acidulation of a phosphorous containing source with nitric acid and results in the direct production of water soluble nitrophosphate fertilizers. By the terminology "-nitrophosphate fertilizers" as utilized herein is meant the conventional way in which such fertilizers are defined: for example, mixed fertilizers that have been formed by the acidulation, of a phosphorous source, such as, e.g., phosphate rock, with nitric acid, either alone or in combination with other acidulants.

It has been found that by directly reacting the acidulation effluent, with a large excess of ammonium carbonate or ammonium bicarbonate or mixtures thereof, there results of completely water soluble fertilizer composition composed of ammonium phosphate and ammonium nitrate. The present process can best be summarized by the following simplified equations representing the reactions occurring in the process:

8. $Ca_3(PO_4)_2 + 6HNO_3 \rightarrow 2H_3PO_4 + 3Ca(NO_3)_2$
9. $2H_3PO_4 + 3Ca(NO_3)_2 + 5(NH_4)_2CO_3$ excess $(NH_4)_2CO_3 \rightarrow$
   $3CaCO_3 \downarrow + 6NH_4NO_3 + 2(NH_4)_2HPO_4 + 2H_2O + 2CO_2 \uparrow$ As previously mentioned, the products resulting from the nitric acid acidulation will vary according to the amount of nitric acid used. The reaction according to equation 2. indicates that at least a $HNO_3/Ca_3(PO_4)_2$ (in the rock) ratio of 4:1 is essential to obtain water-soluble reaction products, the tricalcium phosphate being converted to water-soluble monocalcium phosphate together with calcium nitrate and phosphoric acid. The reactions according to equations 1 and 8 are the conventional acidulation utilizing sufficient nitric acid so as to produce phosphoric acid and calcium nitrate. The reactions according to equations 9 and 11 are the discovery constituting the basis of the present invention. The process of the present invention involves simultaneously neutralizing the phosphoric acid and converting the calcium nitrate present in the acidulation effluent by reaction with ammonium carbonate or ammonium bicarbonate or mixtures thereof in the presence of a large excess of ammonium carbonate or ammonium bicarbonate.

In the practice of the present invention, a phosphorous source is acidulated with nitric acid to form a solution of calcium nitrate in phosphoric acid. This solution is reacted in an excess of ammonium carbonate or ammonium bicarbonate to precipitate calcium carbonate and form a solution of ammonium nitrate and ammonium phosphate. After the precipitated calcium carbonate has been removed by filtration, the solution can be converted into a 100 percent water soluble fertilizer by any of the conventional methods.

If only the stoichiometric amount of nitric acid is used as in equation 2 on page 2, an $N/P_2O_5$ ratio of about 2 results. Higher $N/P_2O_5$ ratios can be obtained by increasing the amount of nitric acid used in the acidulation step. Lower $N/P_2O_5$ ratios can be obtained by adding phosphoric acid to the acidulation step. Alternatively, lower $N/P_2O_5$ ratios can be obtained by replacing a portion of the nitric acid used in the acidulation with sulfuric acid on a proton basis. This results in the formation of $CaSO_4$, which on reaction with $(NH_4)_2CO_3$ produces $(NH_4)_2SO_4$, and thereby replaces $NH_4NO_3$ with $(NH_4)_2SOB4$ in the final product, lowering the $N/P_2O_5$ ratio. Additionally, lower $N/P_2O_5$ ratios can be obtained by reacting excess ammonium carbonate or ammonium bicarbonate solution with the reaction products of the nitric acid acidulation wherein the nitric acid to phosphate ratio is such that water soluble monocalcium phosphate is the major portion of any calcium phosphate formed by the acidulation step, i.e.,:

10. 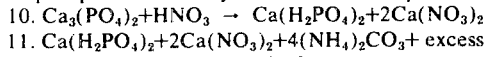
11. 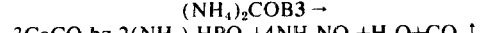
    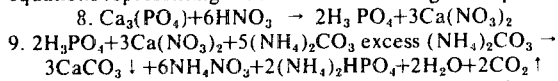

In a preferred embodiment of this invention, there is provided a process for the production of water soluble nitrophosphate fertilizers comprising a. neutralization and simultaneous calcium nitrate conversion of a reaction mixture resulting from the nitric acid acidulation of a phosphorous source by introducing that reaction mixture into a ammonium carbonate reactor containing ammonium carbonate in large excess, b. filtration of the calcium carbonate formed during said neutralization and conversion, c. heating the resulting solution so as to remove the excess ammonium carbonate in the form of ammonia and carbon dioxide and recycling the excess ammonium carbonated in the form of ammonia and carbon dioxide to the ammonium carbonate reactor, and d. recovering from the remaining solution the final nitrophosphate fertilizer which comprises the mixed fertilizers of ammonium nitrate and ammonium phosphate.

A schematic diagram of the overall process of the preferred embodiment of this invention is shown in the sole figure.

The acidulation step is ordinarily conducted in conventional nitric acid acidulation equipment using as feed, 1. nitric acid in its usual commercially available form, consisting of 50–70 percent by weight nitric acid. The amount of nitric acid used is variable, depending on the desired $N/P_2O_5$ grade of the final nitrophosphate fertilizer; and water can be added in any amount suitable for maintaining the fluidity of the resultant reaction mixture slurry; 2. a source of phosphorous, preferably phosphate rock, such as Florida phosphate rock, which is primarily composed of calcium phosphate having a $P_2O_5$ content of about 30–35 percent; any other phosphate source, however, that is available in suitable quantities can be used in this invention. Typical commercial phosphate sources include those mentioned on page 99 of "Superphosphate: Its History, Chemistry, and Manufacture," a volume issued Dec. 1964 by the U.S. Department of Agriculture, whose disclosure in this regard is hereby incorporated by reference. In general, suitable phosphate sources, include those commonly known in the art by their geographical names, viz, e.g., "Carolina," "-Western," "Morocco," "Kola," (U.S.S.R.) etc. Preferably, however, the phosphate source used has a $P_2O_5$ content of at least about 30 percent although other sources of less $P_2O_5$ content can be utilized in the practice of this invention.

The presence of an excessive amount of fluorine in the phosphate rock used can have a deleterious effect in the neutralization-conversion step. It has been found that the presence of fluorine in the nitric acid-phosphate rock acidulation effluent in a $F/H_3PO_4$ weight ratio of greater than about 0.0034 hindered the formation of water soluble phosphates via the reaction of the acidulation effluent with excess ammonium carbonate. In order to carry out this invention is a practical manner, either 1. phosphate sources low in fluorine content, such as defluorinated phosphate rock, there has been inserted—or phosphate rock which on acidulation will result in an $F/H_3PO_4$ weight ratio, in the acidulation effluent, that is less or no greater than 0.0034, must be used in the acidulation step; or 2. if fluorine containing phosphate sources are used, the fluorine can be prevented from hindering the progress of the reaction by the addition of NaCl and $SiO_2$ to the acidulate, thereby causing the precipitation of the fluorine in the form of $Na_2SiF_6$. In a like manner, KCl can be used in place of NaCl, thereby precipitating $K_2SiF_6$.

The temperatures at which acidulation is conducted range from about 110° to 170° F., preferably 140° to about 160° F. No source of external heat is required since the autogeneous heat of reaction is sufficient to maintain the temperature.

Upon completion of the acidulation step, the reaction mixture, comprising mainly phosphoric acid and calcium nitrate, is reacted with ammonium carbonate or ammonia and carbon dioxide in the ammonium carbonate reactor to precipitate calcium carbonate and form a solution of ammonium nitrate, ammonium phosphate, and the unreacted excess ammonium carbonate. It has been found that total conversion of the acidulation effluent can be effected only if the mole ratio of $CO_2/H_3PO_4$ in the ammonium carbonate reactor is maintained above about 7 and preferably between 8 and 15, although the process of the present invention is still operable at lower efficiencies, at lower mole ratios. The $CO_2/H_3PO_4$ mole ratio utilized is defined as the ratio of the molar amount of $CO_2$ present as ammonium carbonate or ammonium bicarbonate to the molar amount of phosphoric acid resulting from the nitric acid acidulation. In those cases where it is desired to vary the $N/P_2O_5$ ratio of 2 achieved by the reaction according to equation 9, the ratio refers to equivalent molar amounts of phosphoric acid.

Temperature considerations as regards the efficiency of the ammonium carbonate reactor are not critical and the neutralization-conversion is carried out at the reaction temperature which ranges between 70° and 180° F. Likewise, pressure considerations as regards the efficiency of the reactor are not critical, although it is preferred to carry out the neutralization-conversion in a closed system in order to minimize ammonia and carbon dioxide losses. Alternatively, although less preferred, the reaction can be carried out open to the atmosphere with the recovery of any evolved ammonia and carbon dioxide by conventional scrubbing methods.

Upon completion of the neutralization-conversion step, the reaction mixture is filtered as shown in the filtration step in the sole figure, and calcium carbonate is removed therefrom. Filtration of said slurry is necessary in order to prevent the reaction of calcium carbonate with diammonium phosphate during subsequent processing and storage, which would result in loss of water soluble phosphate values. Filtration is effected in conventional filters such as Prayon tilling pans or Dorr-Oliver table filters etc., at filtering temperatures of about 90° to 150° F.

The supernatant liquid that has been separated from the filtration from which calcium carbonate was removed as a solid contains diammonium phosphate, ammonium nitrate and excess ammonium carbonate. The solution is heated to a temperature of between 150° and 300° F., preferably between 200° and 250° F., whereupon the excess ammonium carbonate is "stripped" from the solution in the form of gaseous ammonia and carbon dioxide which is recycled to the ammonium carbonate reactor along with additional ammonia and carbon dioxide introduced from an outside source so as to maintain the desired $CO_2/H_3PO_4$ ratio in the reactor.

The remaining liquid containing ammonium phosphate and ammonium nitrate is then introduced into conventional apparatus, for example, such as a granulator, spherodizer, etc., and the final nitrophosphate fertilizer product is recovered therefrom in the form of a solid water-soluble mixed ammonium nitrate-ammonium phosphate fertilizer. Alternatively, the liquid can be concentrated and utilized as a fluid fertilizer.

This invention is further illustrated by the following examples, but it is to be understood that they should not be construed as limiting the invention in any manner whatsoever.

In each of the following examples, example 1–5, approximately one liter of ammonium carbonate solution was prepared by bubbling ammonia and carbon dioxide through distilled water contained in a stainless steel pressure reactor. About 50–100 cc. of a solution simulating the mixture resulting from the nitric acid acidulation of phosphate rock (said solution containing $Ca(NO_3)_2 \cdot 4H_2O$, 85 percent $H_3PO_4$, and water in a weight ratio of 236:69:150) was then pressurized into the reactor and carbon dioxide bubbled through the reaction medium. The resultant slurry was then sampled, filtered, and analyzed for percent $HN_3$, percent $CO_2$ and percent water soluble and water insoluble $P_2O_5$. The latter analyses were obtained by determining the $P_2O_5$ contents of the filtrates and precipitates resulting from the above filtration step. Additional simulated nitric acid-phosphate rock acidulation effluent was then introduced into the reactor and the sampling procedure repeated. Initial work showed that neither the length of time between samples, in the range of 2 minutes to 6 hours, nor the temperature of the reaction, in the range of 80° to 160° F., nor the operating pressure, in the range of atmospheric to 30 p.s.i.g. of $CO_2$ had a significant effect on the results obtained.

The data and the results obtained from these examples are included in table I.

TABLE I

| Ex. | Sample | Moles/100 grams slurry sample | | | Mole Ratio $CO_2/H_3PO_4$ | Water soluble/total $P_2O_5$, percent |
|---|---|---|---|---|---|---|
| | | $NH_3$ [1] | $CO_2$ [1] | $H_3PO_4$ [2] | | |
| 1 | Initial [3] | 0.86 | 0.47 | | | |
| | 1st addition | 0.88 | 0.49 | 0.0030 | 60 | 93.9 |
| | 2nd addition | 0.74 | 0.42 | 0.016 | 26 | 94.9 |
| | 3rd addition | 0.56 | 0.33 | 0.026 | 13 | 90.7 |
| | 4th addition | 0.43 | 0.27 | 0.036 | 7.5 | 60.4 |
| | 5th addition | 0.28 | 0.20 | 0.050 | 4 | 46.9 |
| 2 | Initial [3] | 1.05 | 0.42 | | | |
| | 1st addition | 1.00 | 0.45 | 0.0076 | 60 | 96.6 |
| | 2nd addition | 0.86 | 0.46 | 0.018 | 26 | 97.9 |
| | 3rd addition | 0.49 | 0.30 | 0.021 | 14 | 96.0 |
| | 4th addition | 0.36 | 0.23 | 0.038 | 6 | 59.1 |
| | 5th addition | 0.24 | 0.17 | 0.050 | 3 | 43.5 |
| 3 | Initial [3] | 0.98 | 0.52 | | | |
| | 1st addition | 0.65 | 0.37 | 0.024 | 15.4 | 90.1 |
| | 2nd addition | 0.58 | 0.33 | 0.026 | 12.7 | 88.8 |
| | 3rd addition | 0.51 | 0.31 | 0.028 | 11.1 | 90.1 |
| | 4th addition | 0.43 | 0.26 | 0.032 | 8.1 | 89.1 |
| | 5th addition | 0.33 | 0.22 | 0.034 | 6.5 | 76.6 |
| 4 | Initial [3] | 0.93 | 0.46 | | | |
| | 1st addition | 0.91 | 0.50 | 0.005 | 98 | 97.5 |
| | 2nd addition | 0.76 | 0.43 | 0.011 | 38 | 97.1 |
| | 3rd addition | 0.57 | 0.35 | 0.017 | 20.5 | 97.2 |
| | 4th addition | 0.48 | 0.31 | 0.021 | 15 | 90.5 |
| 5 | Initial [3] | 1.12 | 0.49 | | | |
| | 1st addition | 0.88 | 0.52 | 0.010 | 50 | 95.2 |
| | 2nd addition | 0.70 | 0.45 | 0.016 | 26 | 97.5 |
| | 3rd addition | 0.54 | 0.37 | 0.031 | 12 | 96.2 |

[1] $NH_3$ and $CO_2$ contents of liquid phase of slurry only.
[2] $P_2O_5$ content of both liquid and solid phase of slurry, expressed as $H_3PO_4$.
[3] Sample taken prior to addition of simulated nitric acid phosphate rock mixture.

From the above examples, it can readily be seen that the neutralization-conversion of the nitric acid acidulation step occurring in the reactor is dependent on the concentration of ammonium carbonate in the reactor in relation to the amount of phosphate introduced. It can be seen that the percent conversion of phosphate to water soluble forms increases with the increase over the stoichiometric amount of ammonium carbonated needed for neutralization-conversion.

In order to demonstrate the flexibility of the process of the present invention as regards variation in $N/P_2O_5$ ratios, examples 6–9 are performed, in the same manner as the prior examples, except that the filtrates obtained from the slurry samples at a $CO_2/H_3PO_4$ mole ratio of 15 are ammoniated to a pH of 8.0, evaporated to dryness, and analyzed as dry solids for percent N and percent $P_2O_5$. Example 6 is the case in which stoichiometric amounts of $HNO_3$ and $Ca_3(PO_4)_2$ are simulated by the $Ca(NO_3)_2 \cdot 4H_2O - H_3PO_4$ mixture as in the prior examples. Examples 7, 8, and 9 are the cases in which lower $N/P_2O_5$ ratios are obtained by respectively decreasing the amount of $HNO_3$ used in acidulating $Ca_3(PO_4)_2$ (example 7); adding supplemental $H_2PO_4$ to the $HNO_3 - Ca_3(PO_4)_2$ acidulant (example 8); and replacing one-half of the $HNO_3$ with $H_2SO_4$ on an equivalent basis in the $Ca_3(PO_4)_2$ acidulation.

The results from these examples are shown in table II.

TABLE II

| Example No.: | Acidulation mole ratio $HNO_3/Ca_3(PO_4)_2$ | Mole supplemental acid $H_2SO_4/Ca_3(PO_4)_2$ | $H_3PO_3/Ca_3(PO_4)_2$ | Solid product, percent N | $P_2O_5$ |
|---|---|---|---|---|---|
| 6 | 6 | 0 | 0 | 28 | 14 |
| 7 | 4 | 0 | 0 | 26 | 19 |
| 8 | 6 | 0 | 3 | 24 | 24 |
| 9 | 3 | 1.5 | 0 | 24 | 17 |

The effect of fluorine in hindering formation of water soluble phosphates is shown in examples 10–13. In these examples, the procedure used was the same as used in examples 1–5 except that fluorine in the form of fluorosilicylic acid was added to the simulated acidulation product prior to introduction into the ammonium carbonate reactor.

The examples and the results therefrom are shown in table III.

TABLE III

| Example | Sample | Moles/100 grams slurry sample $NH_3$[1] | $CO_2$[1] | $H_3PO_4$[2] | Ratio $F/H_3PO_4$[3] | $CO_2/H_3PO_4$[4] | Water soluble/total $P_2O_5$, percent |
|---|---|---|---|---|---|---|---|
| 10 | Initial[5] | 1.12 | 0.57 | | | | |
| | 1st addition | 1.00 | 0.55 | 0.0038 | 0.034 | 145 | 63.6 |
| | 2nd addition | 0.85 | 0.49 | 0.018 | 0.034 | 27 | 36.8 |
| | 3rd addition | 0.73 | 0.45 | 0.028 | 0.034 | 16 | 28.1 |
| | 4th addition | 0.58 | 0.35 | 0.036 | 0.034 | 9.7 | 24.8 |
| | 5th addition | 0.43 | 0.27 | 0.046 | 0.034 | 5.9 | 21.2 |
| | 6th addition | 0.38 | 0.24 | 0.056 | 0.034 | 4.3 | 15.7 |
| 11 | Initial[5] | 0.97 | 0.52 | | | | |
| | 1st addition | 0.86 | 0.61 | 0.0052 | 0.0034 | 117 | 55.4 |
| | 2nd addition | 0.74 | 0.42 | 0.015 | 0.0034 | 27 | 38.8 |
| | 3rd addition | 0.56 | 0.35 | 0.024 | 0.0034 | 14.6 | 38.7 |
| | 4th addition | 0.44 | 0.28 | 0.036 | 0.0034 | 7.8 | 28.4 |
| | 5th addition | 0.25 | 0.20 | 0.046 | 0.0034 | 4.3 | 19.5 |
| 12 | Initial[5] | 1.04 | 0.55 | | | | |
| | 1st addition | 0.68 | 0.39 | 0.023 | 0.00034 | 17 | 87.8 |
| | 2nd addition | 0.52 | 0.31 | 0.028 | 0.00034 | 11 | 87.4 |
| | 3rd addition | 0.41 | 0.26 | 0.034 | 0.00034 | 7.7 | 73.1 |
| 13 | Initial[5] | 1.20 | 0.58 | | | | |
| | 1st addition | 0.89 | 0.49 | 0.0081 | 0.00034 | 30 | 93.8 |
| | 2nd addition | 0.74 | 0.47 | 0.011 | 0.00034 | 21 | 88.8 |
| | 3rd addition | 0.67 | 0.38 | 0.015 | 0.00034 | 13 | 77.3 |
| | 4th addition | 0.54 | 0.31 | 0.017 | 0.00034 | 9.2 | 62.3 |

[1] $NH_3$ and $CO_2$ contents of liquid phase of slurry only.
[2] $P_2O_5$ content of both liquid and solid phases of slurry, expressed as $H_3PO_4$.
[3] Weight ratio of fluorine to phosphoric acid contents. Fluorine present as $H_2SiF_6$.
[4] Mole ratio of carbon dioxide to phosphoric acid.
[5] Sample taken prior to addition of simulated nitric acid-phosphate rock mixture.

Example 14 shows the effect of adding NaCl and $SiO_2$ to a fluorine-containing, simulated nitric acid-phosphate rock acidulation effluent in order to prevent the reversion of water soluble phosphates. This test was carried out in a similar manner to that of example 11 ($F/H_3PO_4$ weight ratio of acidulate = 0.0034), except that 10 grams of NaCl and 10 grams of $SiO_2$ were added to 400 grams of the simulated acidulation effluent prior to its addition to the ammonium carbonate solution.

| Ex. | Sample | Moles/100 grams sample $NH_3$[1] | $CO_2$[2] | $H_3PO_4$ | Mole ratio $CO_2/H_3PO_4$ | Water soluble/total $P_2O_5$ |
|---|---|---|---|---|---|---|
| 14 | Initial[3] | 1.09 | 0.56 | | | |
| | 1st addition | 0.79 | 0.44 | 0.015 | 29 | 82.4 |
| | 2nd addition | 0.66 | 0.37 | 0.024 | 15 | 87.2 |
| | 3rd addition | 0.55 | 0.31 | 0.030 | 10 | 74.7 |
| | 4th addition | 0.42 | 0.24 | 0.038 | 6.3 | 56.1 |
| | 5th addition | 0.28 | 0.16 | 0.49 | 3.3 | 36.9 |

[1] $NH_3$ and $CO_2$ contents of liquid phase of slurry only.
[2] $P_2O_5$ content of both liquid and solid phases of slurry, expressed as $H_3PO_4$.
[3] Sample taken prior to addition of simulated nitric acid-phosphate rock mixture.

While the process of the present invention for nitrophosphate fertilizer preparation has been essentially discussed heretofore in terms of its most preferred embodiments, alternative embodiments are available and can be practiced in a manner contemplated by the invention. For example, the present process has been described in terms of recycling the excess ammonium carbonate contained in the fertilizer solution after reaction in the ammonium carbonate reactor. However, an external source of the excess ammonium carbonate required in the ammonium carbonate reactor can be utilized. This precludes the necessity of recycling the excess ammonia and carbon dioxide released on heating the filtered fertilizer solution as shown in the figure. While the use of ammonium carbonate is preferred, ammonium bicarbonate or mixtures of ammonium carbonate and ammonium bicarbonate can be utilized.

While the preferred embodiments of this invention have been previously discussed in terms of nitrophosphate fertilizer production, it is within the purview and contemplation of this invention of incorporate other fertilizer nutrients in the ultimate fertilizer product obtained so as to provide a more complete fertilizer. Such additional nutrients, as for example, KCl, $K_2SO_4$, $KNO_3$, urea, and ammoniated polyphosphates, etc., can be incorporated in the finishing stage of the present process.

From the above, it will be understood that the foregoing

What is claimed is:

1. A process for the production of nitrophosphate fertilizers of different $N/P_2O_5$ ratios, comprising:
   a. acidulating calcium phosphate rock low in fluorine content with nitric acid, the molar ratio of the $HNO_3/Ca_3(PO_4)_2$ being at least 4:1, the concentration and amount of $HNO_3$ being sufficient to produce an acidulation effluent comprising phosphoric acid, calcium nitrate, with water-soluble monocalcium phosphate being the major portion of any calcium phosphate therein, the content of fluorine in the rock being such that the weight ratio of $F/H_3PO_4$ in the acidulation effluent is less than 0.0034;
   reacting the acidulation effluent with a large excess of a basic material selected from the group consisting of ammonium carbonate, ammonium bicarbonate, and mixtures thereof, the amount of basic material being sufficient to produce a solution containing completely water-soluble ammonium nitrate and ammonium phosphate, and to precipitate the calcium content as calcium carbonate;
   c. removing said calcium carbonate precipitate from the solution
   d. recovering the excess basic material as gaseous ammonia and carbon dioxide by heating the solution at a temperature within the range of from about 150° F. to about 300° F.; and
   e. treating the resultant solution to recover a solid, water soluble nitrophosphate product.

2. A process according to claim 1 wherein the $CO_2/H_3PO_4$ mole ratio during said reaction is between about 8 and about 15.

3. A process according to claim 1 wherein the basic material comprises ammonium carbonate.

4. A continuous process according to claim 1 wherein the recovered ammonia and carbon dioxide are recycled to the acidulation effluent-basic material reacting stage.

5. A process according to claim 1 wherein the acidulation effluent is reacted with an excess of ammonium carbonate.

6. A process according to claim 1 wherein the $CO_2/H_3PO_4$ mole ratio during said reaction is between about 8 and about 15.

7. A continuous process for the production of nitrophosphate fertilizers of different $N/P_2O_5$ ratios, comprising
   a. acidulating calcium phosphate rock low in fluorine content with nitric acid, the molar ratio of $HNO_3/Ca_3(PO_4)_2$ being at least 4:1, the concentration and amount of $HNO_3$ being sufficient to produce an acidulation effluent comprising phosphoric acid, calcium nitrate, with water-soluble monocalcium phosphate being the major portion of any calcium phosphate therein, the content of fluorine in the rock being such that the weight ratio of $F/H_3PO_4$ in the acidulation effluent is less than 0.0034;
   b. reacting the acidulation effluent with a large excess of ammonium carbonate wherein the amount of ammonium carbonate present is determined by the $CO_2/H_3PO_4$ mole ratio, said ratio being between about 8 and about 15, said amount of ammonium carbonate being sufficient to produce a solution containing completely water-soluble ammonium nitrate and ammonium phosphate, and to precipitate the calcium content as calcium carbonate;
   c. removing said calcium carbonate precipitate from the solution, and recovering the excess ammonium carbonate as ammonia and carbon dioxide by heating the solution to a temperature of between about 150° F. and 300° F.;
   d. recycling said ammonia and carbon dioxide to the acidulation effluent-ammonium carbonate reaction stage; and
   e. treating the resultant solution to recover a solid water soluble nitrophosphate product.

8. A process for the production of nitrophosphate fertilizers of different $N/P_2O_5$ ratios, comprising:
   a. acidulating calcium phosphate rock with nitric acid, the molar ratio of the $HNO_3/Ca_3(PO_4)_2$ being at least 4:1, the concentration and amount of nitric acid being sufficient to produce an acidulation effluent comprising phosphoric acid, calcium nitrate, with water-soluble monocalcium phosphate being the major portion of any calcium phosphate therein, the content of fluorine in the rock being such that the weight ratio of $F/H_3PO_4$ in the acidulation effluent is greater than about 0.0034;
   b. adding to the acidulation effluent an amount of $SiO_2$ and an alkali metal chloride selected from the group consisting of NaCl and KCl to precipitate out the fluorine as an alkali metal fluorosilicate;
   c. reacting the acidulation effluent with a large excess of an ammonium carbonate material wherein he amount of said material present is determined by the $CO_2/H_3PO_4$ mole ratio, said ratio being above about 7, said amount of ammonium carbonate material being sufficient to produce a solution containing completely water-soluble ammonium nitrate and ammonium phosphate, and to precipitate the calcium content as calcium carbonate;
   d. removing said calcium carbonate precipitate from the solution,
   e. recovering the excess basic material as ammonia and carbon dioxide by heating the solution at a temperature within a range of from 150° F. to about 300° F., and
   f. treating the resultant solution to recover a solid water soluble nitrophosphate product.